Sept. 26, 1967  R. A. MILLER ET AL  3,343,529
SPIROMETER

Filed March 31, 1965  2 Sheets-Sheet 1

INVENTORS
RONALD A. MILLER.
JOHN R. POTRAFKA.
BY
D. Emmett Thompson
ATTORNEY.

INVENTORS
RONALD A. MILLER.
JOHN R. POTRAFKA.
BY
D. Emmett Thompson
ATTORNEY.

United States Patent Office 3,343,529
Patented Sept. 26, 1967

3,343,529
SPIROMETER
Ronald A. Miller, 207 Woodland Road, Syracuse, N.Y. 13219, and John R. Potrafka, Otter Lake, N.Y. 13427
Filed Mar. 31, 1965, Ser. No. 444,332
4 Claims. (Cl. 128—2.08)

This invention relates to apparatus for the measurement of pulmonary ventilation, tidal volume and respiratory rate, as a guide to the maintenance of normal arterial gas tensions. Apparatus of this general type is disclosed in our copending application 257,388, filed Feb. 11, 1963, and issued Dec. 7, 1965, as Patent Number 3,221,732.

This invention has as an object an apparatus for the measurement of pulmonary ventilation that embodies a particularly simple, and inexpensive structural arrangement, which functions to accurately monitor the expired tidal volume of a patient, regardless of how little or how great the volume and does not require or involve any settings or adjustments of the functional part of the apparatus.

The invention has as a further and more particular object a unique valve mechanism which functions by the negative pressure, established by initial inhalation, to quickly and completely exhaust the spirometer of the measured volume of each exhalation.

The invention consists in the novel features and in the combinations and constructions hereinafter set forth and claimed.

In describing this invention, reference is had to the accompanying drawings in which like characters designate corresponding parts in the views.

Figure 2:
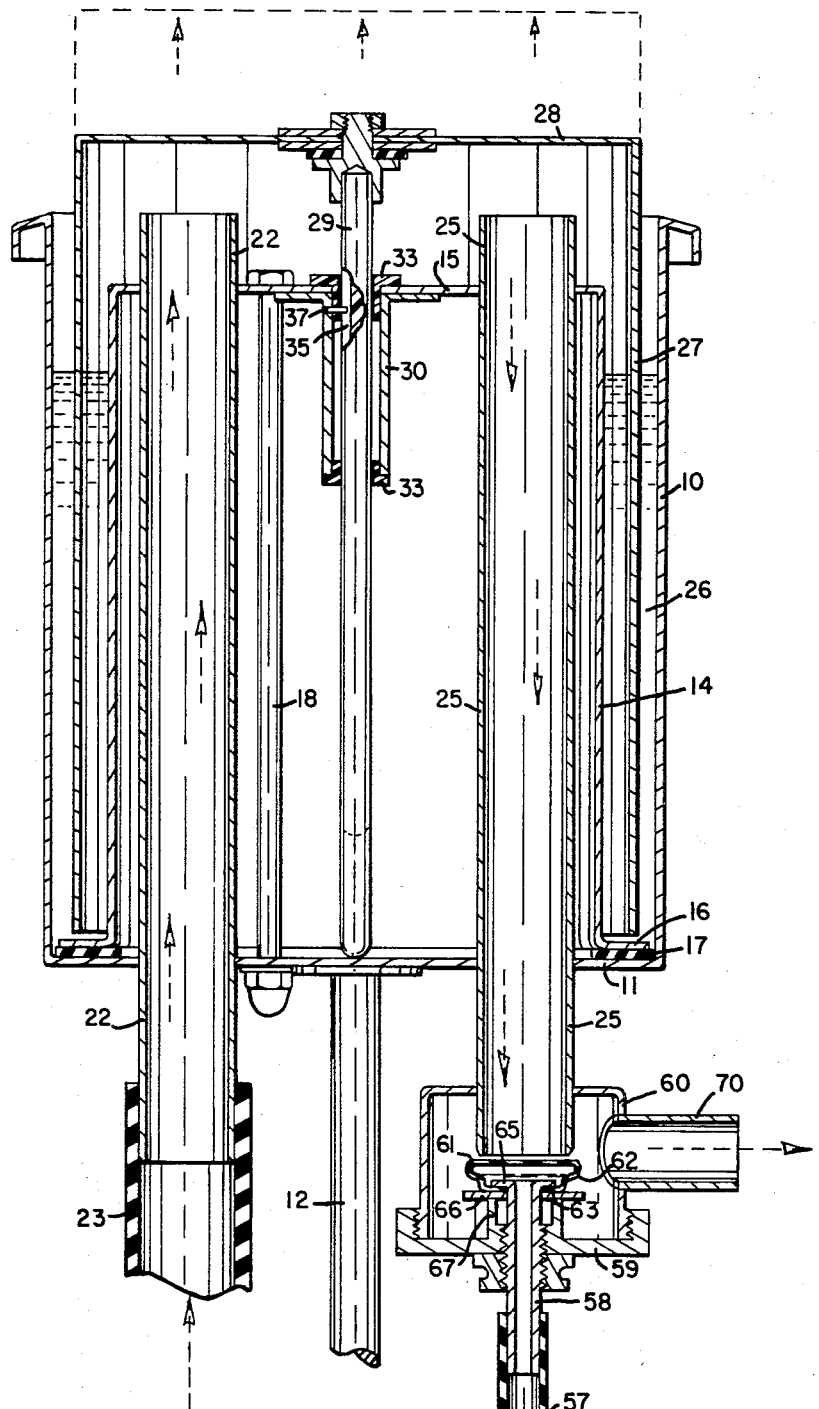
FIGURE 2 is a vertical sectional view of the tank and diving bell member shown in the upper portion of FIGURE 1.

The apparatus includes a tank member 10 preferably of cylindrical shape and provided with a closed bottom wall 11. The tank is supported on a vertical stem 12 mounted on a base 13. A cylindrical member 14, FIGURE 2, is positioned concentrically within the tank 10 and is provided with a closed top wall 15. The lower end of the member 14 is formed with an outward extending lateral flange 16 positioned on a gasket 17. The member 14 is clamped against the gasket 17 by tie rods 18 extending through the top wall 15 of the member 14 and through the bottom wall 11 of the tank.

Inlet tube 22 is fixedly secured in the bottom wall 11 of the tank member, the upper end of the tube terminating substantially in the plane of the upper edge of the tank, and the tube has a portion extending downwardly from the bottom wall of the tank for the reception of a conduit 23. There is also an exhaust tube 25 similarly mounted in the tank member.

The purpose of the cylindrical member 14 is to provide an annular chamber 26 for the reception of a quantity of water to form a water seal for the lower open end of a diving bell member 27, provided with a closed top wall 28, and being guided for vertical movement in the tank by a stem 29 slidably mounted in a sleeve 30 arranged centrally in the top wall 15 of the member 14. The sleeve 30 is provided with bushings 33. Preferably, these bushings and the stem 29 are formed of anti-friction material such as nylon.

The stem 29 is formed with a lengthwise extending groove 35 to slidably receive the inner end of a pin 37 mounted in the sleeve 30. The purpose of the groove and pin arrangement is to prevent rotation of the diving bell 27; the exterior surface of which is provided with indicia to indicate the volume of exhaled air. The free end of the conduit 23 is provided with an inlet passage 40 communicating with atmosphere and there is a check valve 41 mounted in this passage. As here shown, the valve 41 is in a form of a disk flap valve formed of rubber or similar material and is normally in closed position, as shown in full line in FIGURE 3. Upon inhalation by the patient, the valve moves inwardly, as indicated by the dotted outline 43, to permit air to pass through the apparatus 44.

Figure 1:
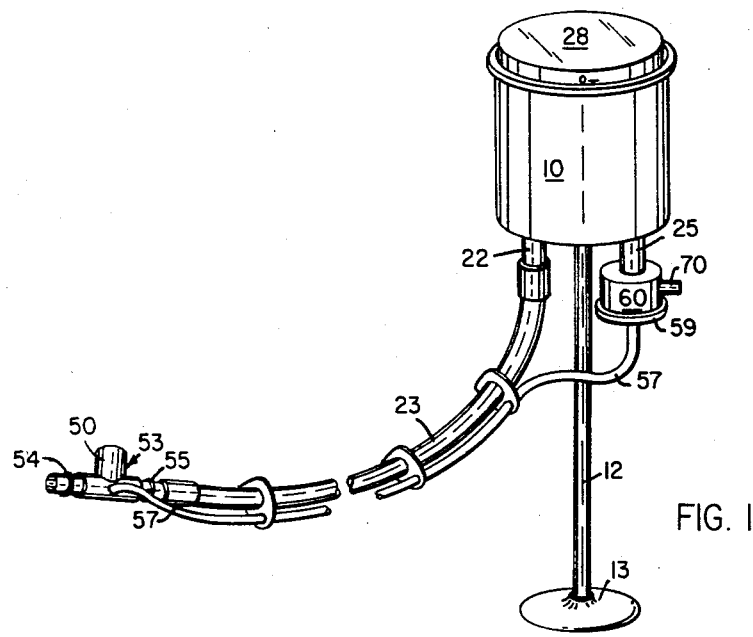
FIGURE 1 is an elevational view of the apparatus embodying our invention.
Figure 3:
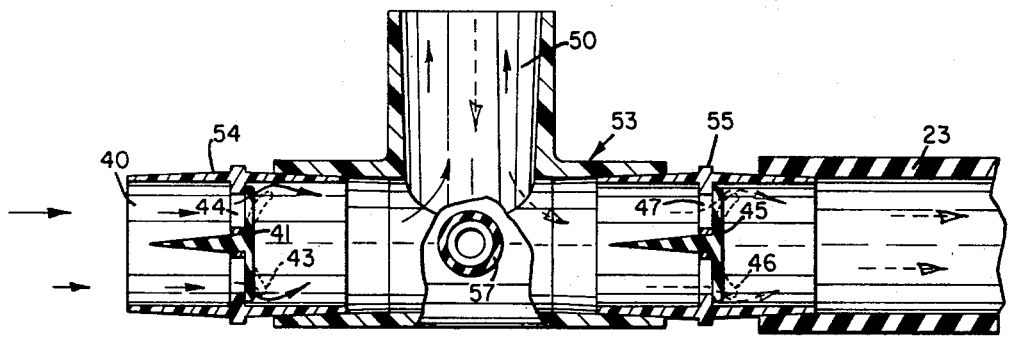
FIGURE 3 is a lengthwise sectional view of the valve casing portion of the conduit extending from the patient's respiratory system to the intake tube of the spirometer.

The conduit 23 is also provided with a check valve 45 normally closed as shown in full line, FIGURE 3, and upon exhalation moved to the dotted line position 46 to permit air to follow through the passages 47, through the conduit 23, to the intake tube 22. The conduit 23 also is provided with a passage 50 arranged intermediate the check valves 41, 45, and which passage has communication with the patient's respiratory system.

For simplicity of manufacturing and convenient replacement of the valves, the conduit 23 includes a T shaped casing member 53, the lateral extension of which includes the passage 50. A nipple 54 is detachably mounted in one end of the casing 53, and a nipple 55 is similarly mounted in the opposite end of the casing. The valve 41 is mounted in the nipple 54, and the valve 45 is mounted in the nipple 55, which is also detachably connected to the main run of the conduit 23. The passage 50 is connected by a flexible conduit, not shown, to the patient's respiratory system; this connection being completed by a mask applied over the patient's nose and mouth or by other conventional arrangements. There is a tube 57 connected to the conduit 23 intermediate the check valves 41, 45; this tube extending to a nipple 58 threaded into a cap 59, which in turn is threaded on the lower open end of a cylindrical member 60 attached to the lower end of the exhaust tube 25.

A valve is provided for opening and closing the lower end of the exhaust tube 25. This valve is moved into engagement with the lower end of the exhaust tube to close the same when a positive pressure is applied against the underside of the valve. When a negative pressure is supplied to the valve, the valve is moved downwardly out of engagement with the exhaust tube to open the same.

As here shown, the valve 61 is in the form of a thin flexible diaphragm valve formed of rubber or the like and having a sidewall 62 of bellows form, terminating in an inwardly extending flange 63, which is clamped between an enlarged head portion 65 on the stem 58, and a washer 66 positioned on a circular flange 67 of the cap member 59.

Figure 4:
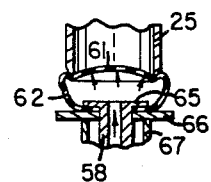
FIGURE 4 is a view showing the exhaust valve in the lower right portion of FIGURE 2 in the closed position.

Immediately upon exhalation by the patient, the valve 41 is moved to closed position, and the valve 45 to open position. The exhaled air is transmitted through the conduit 23, and the intake tube 22 into the upper area of the diving bell. The positive pressure produced by exhalation is also conducted through the tube 57 underneath the diaphragm valve 61, moving it against the lower end of the exhaust tube 25 to close the same, see FIGURE 4. It will be observed that the area of the diaphragm 61, subjected to this positive pressure through tube 57, is slightly greater than the area of the bore of the tube 25 so that the valve 61 is held in closed position during exhalation. If the area within the diving bell above the water is filled with air, the diving bell 27 is moved upwardly a distance in proportion to the volume of exhaled air.

Figure 5:
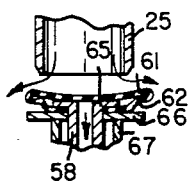
FIGURE 5 is a view similar to FIGURE 4 showing the exhaust valve in open position.

Immediately upon the patient inhaling, valve 45 is closed and a partial vacuum is formed in the tube 57, and accordingly below the diaphragm valve 61, causing the diaphragm 61 to move downwardly out of engagement with the lower end of the exhaust tube 25 and closing the bore in the stem 58, see FIGURE 5. With the exhaust valve moved to this open position, the air entrapped in the upper portion of the diving bell now quickly exhausts through the tube 25 into the chamber 60 and outwardly through the passage 70 to atmosphere. This permits the diving bell to quickly descend to full down position before inhalation by the patient ceases.

Upon initial exhalation, the valve 41 closes and the valve 45 opens, and positive pressure is again provided in tube 57 to move the diaphragm 61 into closed position against the end of tube 25.

In the arrangement described, a volume of air is transmitted within the diving bell 27, which volume is equal to the volume of air exhaled by the patient. This is due to the fact of the column of air remaining within the conduit 23 and intake tube 22, in the upper part of the diving bell 27 and in the exhaust tube 25, whereby the volume of air exhaled by the patient is equal to the volume of air transmitted into the diving bell and, accordingly, the amount of elevation of the diving bell, upon each exhalation, gives an accurate indication of the volume of air exhaled upon each exhalation.

What we claim is:

1. Apparatus for the measurement of pulmonary tidal ventilation comprising a vertically disposed tank member having a bottom wall and being open at the top, intake and exhaust tubes extending upwardly from the lower portion of said tank and terminating at the upper portion thereof, a dividing bell member mounted for vertical movement in said tank member and enclosing the area above the upper ends of said tubes, a volume of water in said tank member forming a water seal at the lower open end of said diving bell, a conduit connected to said intake tube, a first and a second normally closed check valve in said conduit, said conduit having means arranged intermediate said check valves for connection to the respiratory system of the patient, said first check valve being normally closed and movable to open position upon exhalation by the patient for the admission of exhaled air to the upper portion of said diving bell, said second check valve being normally closed and being movable to open position upon inhalation by the patient, an exhaust valve positioned at the lower end of said exhaust tube for movement into and out of engagement therewith, a tube connected to said conduit intermediate said check valves and extending to the underside of said valve for conducting expired air thereto to effect positive pressure to said valve to move the same against the lower end of said exhaust tube, and serving to establish a negative pressure on the underside of said valve upon inhalation by the patient to effect movement of said diaphragm downwardly from said exhaust tube to permit air to exhaust from within said driving bell.

2. Apparatus as set forth in claim 1, wherein said exhaust valve includes a diaphragm formed of thin flexible material.

3. Apparatus as set forth in claim 1, wherein said exhaust valve is operable upon the establishment of said negative pressure to close said tube.

4. Apparatus as set forth in claim 1, wherein said tank member is provided with a guide means positioned axially thereof in said diving bell as a stem slidably mounted in said guide means.

References Cited

UNITED STATES PATENTS 3,221,732  12/1965  Miller et al. _____ 128—2.08

RICHARD A. GAUDET, *Primary Examiner.*

SIMON BRODER, *Examiner.*